United States Patent
Benkual et al.

(10) Patent No.: US 6,848,032 B2
(45) Date of Patent: Jan. 25, 2005

(54) PIPELINING CACHE-COHERENCE OPERATIONS IN A SHARED-MEMORY MULTIPROCESSING SYSTEM

(75) Inventors: Jack Benkual, Cupertino, CA (US); William C. Athas, San Jose, CA (US); Joseph P. Bratt, San Jose, CA (US); Ron Ray Hochsprung, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 260 days.

(21) Appl. No.: 10/256,610

(22) Filed: Sep. 27, 2002

(65) Prior Publication Data

US 2004/0073623 A1 Apr. 15, 2004

(51) Int. Cl.[7] ............................................. G06F 12/08
(52) U.S. Cl. ....................... 711/146; 711/140; 711/141
(58) Field of Search ..................... 709/213; 711/140, 711/141, 146, 167, 169

(56) References Cited

U.S. PATENT DOCUMENTS 5,526,484 A * 6/1996 Casper et al. ............... 709/237
6,336,169 B1 * 1/2002 Arimilli et al. ............. 711/144
6,611,900 B2 * 8/2003 Patel et al. .................. 711/145
6,668,309 B2 * 12/2003 Bachand et al. ............ 711/146
6,735,675 B2 * 5/2004 Breuder et al. ............. 711/146

* cited by examiner

Primary Examiner—Gary Portka
(74) Attorney, Agent, or Firm—Park, Vaughan & Fleming, LLP

(57) ABSTRACT

One embodiment of the present invention provides a system that facilitates pipelining cache coherence operations in a shared memory multiprocessor system. During operation, the system receives a command to perform a memory operation from a processor in the shared memory multiprocessor system. This command is received at a bridge that is coupled to the local caches of the processors in the shared memory multiprocessor system. If the command is directed to a cache line that is subject to an in-progress pipelined cache coherency operation, the system delays the command until the in-progress pipelined cache coherency operation completes. Otherwise, the system reflects the command to local caches of other processors in the shared memory multiprocessor system. The system then accumulates snoop responses from the local caches of the other processor and sends the accumulated snoop response to the local caches of other processors in the shared memory multiprocessor system.

20 Claims, 4 Drawing Sheets

PIPELINING CACHE-COHERENCE OPERATIONS IN A SHARED-MEMORY MULTIPROCESSING SYSTEM

BACKGROUND

1. Field of the Invention

The present invention relates to the design of computer systems. More specifically, the present invention relates to a method and an apparatus for pipelining cache coherence operations in a shared memory multiprocessor system.

2. Related Art

Modern computing systems often include multiple processors to provide increased throughput. Individual processors that are part of these multiprocessor systems can synchronize their operation and can share data through read and write operations to memory locations in a common address space that is shared between all of the processors. To provide low-latency and high-bandwidth data accesses, the processors make use of caches associated with individual processors to keep local copies of data in the common address space.

Since individual processors may contain duplicate copies of the same set of memory locations in their caches, it is important to keep the caches coherent, so that when an item in one cache is modified by a processor, the other caches in the other processors are automatically updated to accurately reflect the same, shared state.

Cache coherence can be facilitated by "snooping" across a global bus that connects the caches of the processors to main memory through a bridge chip. FIG. 1 illustrates such a multiprocessor computing system including a bus 120 that facilitates cache coherence operations. As illustrated in FIG. 1, processors 102 and 104 include CPUs 106 and 110 and caches 108 and 112, respectively. Processors 102 and 104 and bridge 114 are coupled together through bus 120. Bridge 114 is itself coupled to main memory 116 and I/O channel 118.

Bridge 114 includes the memory controller, as well as logic required to present I/O transactions on bus 120 for the purpose of snooping. Each processor 102 and 104 and its cache 108 and 112 is responsible for snooping memory transactions that transpire on bus 120. Processors 102 and 104 use the snooped data to keep their caches coherent with the other caches within the other processors.

While this method of keeping caches coherent has historically been effective in many situations, as processor speeds continue to increase, global bus 120 is rapidly becoming a bottleneck to system performance. In order to remedy this problem, the single global coherence bus 120 can be replaced with unidirectional point-to-point communication paths from each processor to the bridge chip. Coupling the processors to the bridge chip in this way can potentially increase the access speed to main memory. However, coupling the processors to the bridge chip through point-to-point links does not eliminate the bottleneck associated with snooping because each snoop transaction must run to completion prior to starting the next snoop transaction.

What is needed is a method and an apparatus that facilitates snooping in a shared memory multiprocessor system without the problems described above.

SUMMARY

One embodiment of the present invention provides a system that facilitates pipelining cache coherence operations in a shared memory multiprocessor system. During operation, the system receives a command to perform a memory operation from a processor in the shared memory multiprocessor system. This command is received at a bridge that is coupled to the local caches of the processors in the shared memory multiprocessor system. If the command is directed to a cache line that is subject to an in-progress pipelined cache coherency operation, the system delays the command until the in-progress pipelined cache coherency operation completes.

In one embodiment of the present invention, if the command is not directed to a cache line that is subject to an in-progress pipelined cache coherency operation, the system reflects the command to local caches of other processors in the shared memory multiprocessor system. The system then accumulates snoop responses from the local caches of the other processor and sends the accumulated snoop response to the local caches of other processors in the shared memory multiprocessor system.

In a variation on this embodiment, upon reflecting the command, the system stores the address associated with the command in a memory within the bridge.

In a variation on this embodiment, the system determines if the command is directed to a cache line that is subject to an in-progress pipelined cache coherency operation by comparing the address received with addresses of in-progress pipelined cache coherency operations stored in the memory within the bridge. If so, the system waits for the in-progress operations to complete before processing the command.

In a variation on this embodiment, the system removes the address from the memory within the bridge when the command is complete.

In a variation on this embodiment, the system examines a pipeline bit within the command. If the pipeline bit is not set, the system processes the command in a non-pipelined mode.

In a further variation, the system processes the command in a non-pipelined mode by first waiting for in-progress commands to complete. The system then reflects the command to the local caches of other processors in the shared memory multiprocessor system and then resumes processing of subsequent commands.

In a further variation, the system processes a given command in a non-pipelined mode by first reflecting the command to local caches of other processors in the shared memory multiprocessor system. The system then waits for in-progress commands including the given command to complete. Finally, the system resumes processing of subsequent commands.

In a further variation, the system processes the command in a non-pipelined mode by first waiting for in-progress commands to complete. The system then reflects the command to local caches of other processors in the shared memory multiprocessor system and waits for the command to complete. Finally, the system resumes processing of subsequent commands.

In a further variation, the system processes the command in a non-pipelined mode by first examining a memory within the bridge to determine if an in-progress command is being processed in the non-pipelined mode. If so, the system waits for the in-progress command being processed in the non-pipelined mode to complete before reflecting the command to local caches of other processors in the shared memory multiprocessor system. (Note that if the pipeline bit is set and the command is directed to a cache line that is subject to an in-progress operation, the system delays the command until both conditions are satisfied.)

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor Computing System

Figure 2:
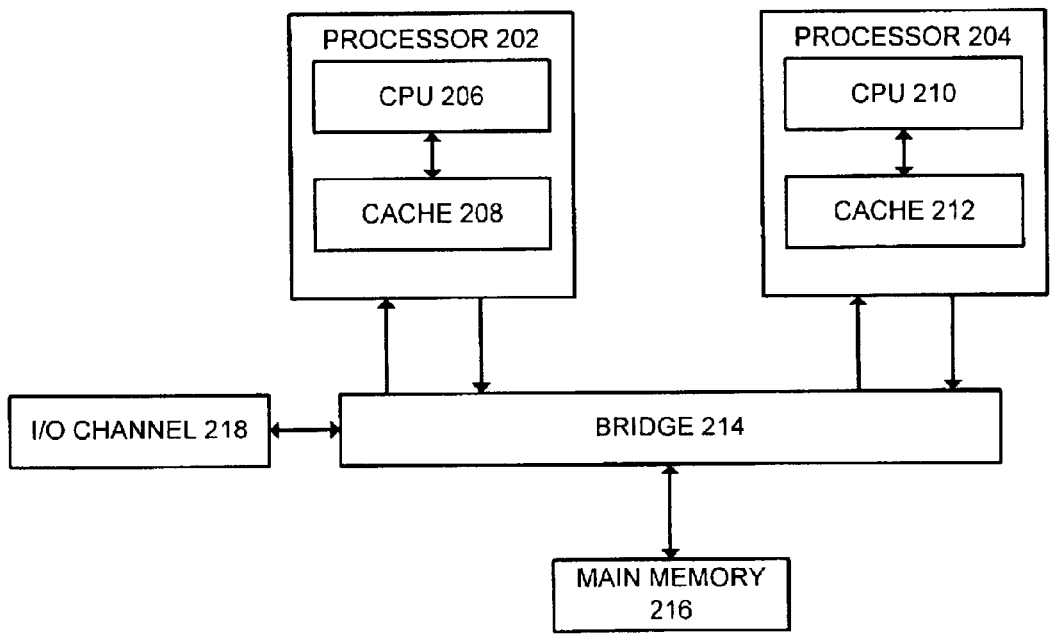
FIG. 2 illustrates a multiprocessor system including point-to-point unidirectional interconnects that support coherence operations in accordance with an embodiment of the present invention.

FIG. 2 illustrates a multiprocessor system that makes use of unidirectional point-to-point connections to support cache coherence operations in accordance with an embodiment of the present invention. The system illustrated in FIG. 2 includes processors 202 and 204, bridge 214, main memory 216 and I/O channel 218. Processors 202 and 204 include CPUs 206 and 210 and caches 208 and 212, respectively. Processors 202 and 204 are coupled to bridge 214 through unidirectional point-to-point interconnections.

Memory transactions using the point-to-point interconnections are accomplished by splitting the transactions into a sequence of pipelined packet-passing operations. For example, to perform a write operation, an individual processor sends the write command and write data to the memory controller within bridge 214 as two contiguous packets. To perform a read operation, the individual processor first sends a read-command packet to bridge 214. Bridge 214 returns the read-data packet to the requesting processor at a later time.

Figure 1:
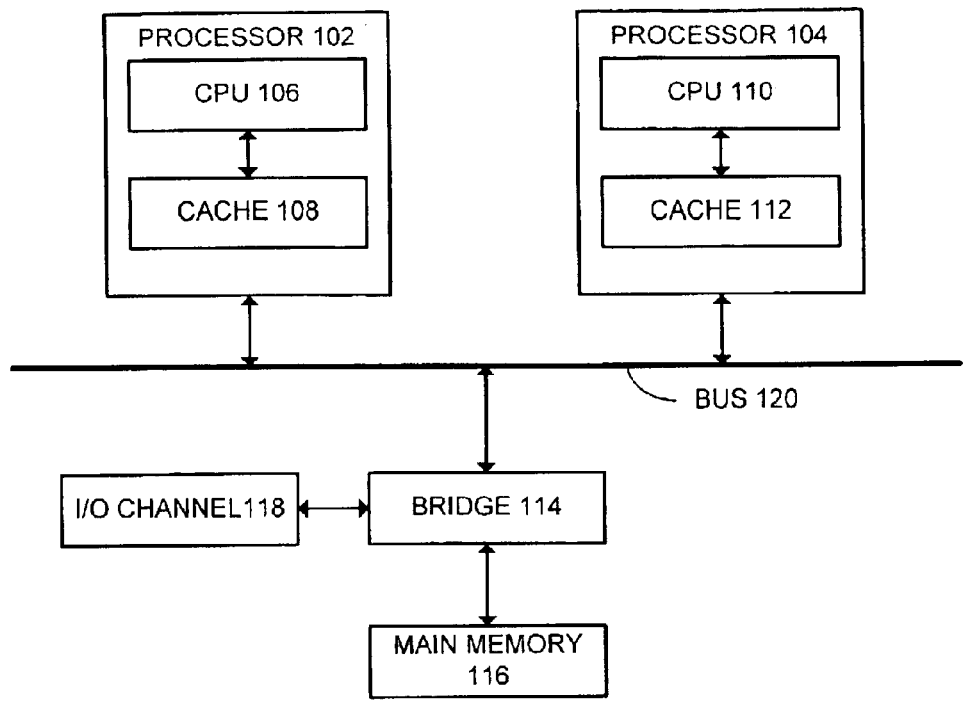
FIG. 1 illustrates a multiprocessor system including a bus that supports coherence operations.

To provide the functionality of the global bus described above with reference to FIG. 1, bridge 214 transmits copies of the read and write commands to the attached processors so the addresses contained in the command packets can be snooped. The process of transmitting the read and write commands to the individual processors is called "reflection." Bridge 214 reflects all commands.

The response time for a read operation begins when the requesting processor first sends the read command, and continues until the requesting processor receives the read data. Note that the data may come from either memory or from the cache of another processor. Similarly, the elapsed time for a write operation begins when a processor first sends the write command and data, and continues until bridge 214 guarantees that the data will be written to memory. Note that the requesting processor keeps a copy of the data being written until bridge 214 guarantees that the data will be or has been written.

In either case, the number of processor cycles between the command dispatch from the requesting processor and the command completion can range from tens of processor cycles to hundreds of processor cycles. One embodiment of the present invention mitigates the impact of these delays by pipelining snooping operations over the unidirectional point-to-point interconnections.

Snoop Processing

Figure 3:
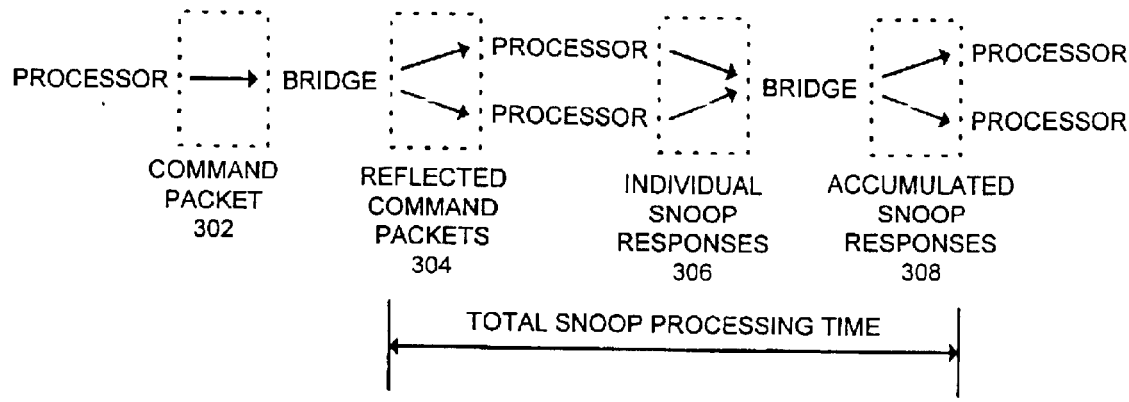
FIG. 3 illustrates how a snoop operation is processed in accordance with an embodiment of the present invention.

FIG. 3 illustrates how a snoop operation is processed in accordance with an embodiment of the present invention. The process starts when a processor sends command packet 302 to bridge chip 214. Bridge chip 214 sends reflected command packets 304 to processors 202 and 204 coupled to bridge chip 214. Processors 202 and 204, in turn, return individual snoop responses 306 to bridge chip 214. Bridge chip 214 then sends accumulated snoop responses 308 to each processor 202 and 204.

In one embodiment of the present invention, a command is not reflected back to the same processor that sent the command packet to bridge chip 214. In another embodiment, for purposes of simplifying the reflection operation, a command is reflected back to all processors, including the processor that sent the command.

As indicated in FIG. 3, the total snoop processing time is measured from when bridge chip 214 sends reflected command packets 304 to the processors until bridge chip 214 sends accumulated snoop responses 308 to the processors 202 and 204.

Note that the above-described snoop operations are pipelined, which means that they take place concurrently in different stages of the pipeline. For example, while a first snoop operation is sending accumulated snoop responses 308, a second snoop operation is accumulating snoop responses 306, a third snoop operation is sending reflected command packets to 304, and a fourth snoop operation is being received at bridge chip 214. Note that this pipelined processing can greatly improve throughput.

Regulating the Flow of Pipelined Commands

Figure 4:
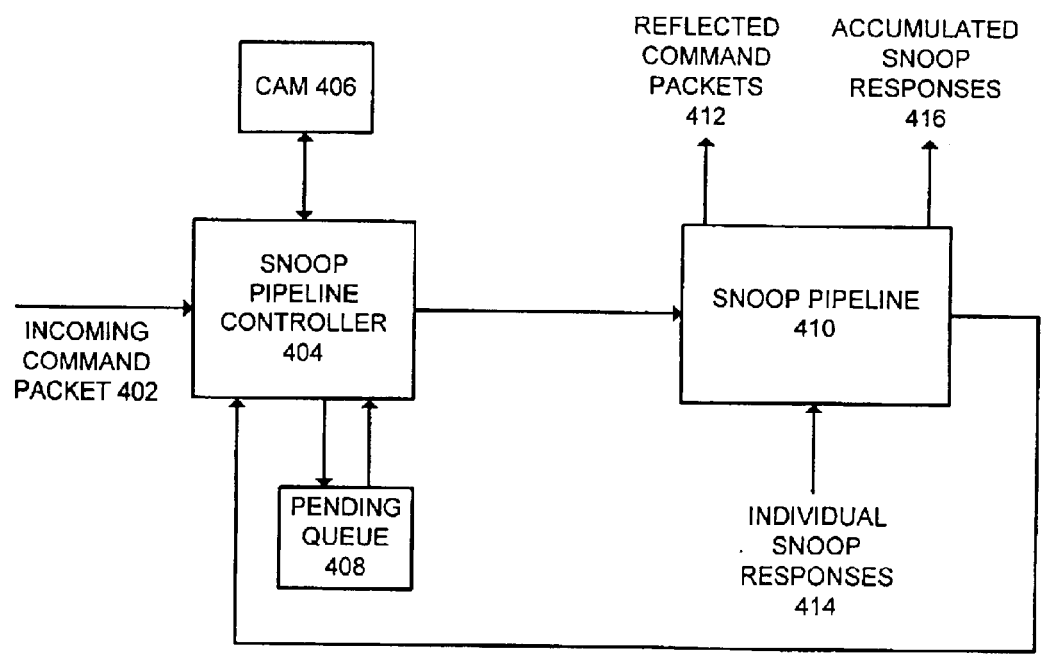
FIG. 4 illustrates a circuit for regulating the flow of pipelined commands in accordance with an embodiment of the present invention.

FIG. 4 illustrates a system for regulating the flow of pipelined commands in accordance with an embodiment of the present invention. The system shown in FIG. 4 is part of bridge 214 and includes snoop pipeline controller 404, snoop pipeline 410, pending queue 408, and content addressable memory (CAM) 406.

Snoop pipeline 410 operates in a manner similar to that described above with respect to FIG. 3. When an incoming command arrives from snoop pipeline controller 404, snoop pipeline 410 first sends out reflected command packets 412. At some later time, snoop pipeline 410 receives individual snoop responses 414 from each processor. After each processor has responded, snoop pipeline 410 sends accumulated snoop responses 416 to each processor. Snoop pipeline 410 also sends a completion signal to snoop pipeline controller 404. Note that snoop pipeline 410 can have multiple commands in progress simultaneously.

Snoop pipeline controller 404 includes circuitry that ensures that commands directed to the same address are handled in sequence. For example, when snoop pipeline controller 404 receives incoming command packet 402 from a processor coupled to bridge 214. Snoop pipeline controller 404 examines the entries in CAM 406 to determine if a command for the address within incoming command packet 402 is already in process. If so, the command is placed on pending queue 408 until the in-process command is complete. Note that snoop pipeline controller 404 places the address related to each command in progress into CAM 406, and removes the address from CAM 406 when a completion is received for the command from snoop pipeline 410.

If there is no matching entry in CAM 406, snoop pipeline controller 404 passes the command to snoop pipeline 410. Additionally, snoop pipeline controller 404 removes commands from pending queue 408 after the address has been cleared from CAM 406 and sends these commands to snoop pipeline 410 for processing.

In another embodiment of the present invention, a pipeline bit is included in incoming command packet 402. If this pipeline bit is set, the command is processed as described above. However, if this pipeline bit is not set, the command is handled in an "unpipelined mode." Depending upon the implementation, the unpipelined mode can operate in one of the following ways:

- The system waits until all outstanding transactions have been processed, and then enters the unpipelined command into the pipeline. The pipelined processing of packets resumes after the unpipelined command packet has been accepted.
- The system accepts the unpipelined command packet but then waits until all outstanding transactions including the unpipelined command packet have been completely processed. The pipelined processing of packets then resumes.
- The system waits until all outstanding transactions have been processed, then accepts the unpipelined command packet. The system then waits until the unpipelined packet has been completely processed. Pipelined packet processing then resumes.
- The system queues the unpipelined packet if and only if there is already an outstanding previous unpipelined command packet being processed. The unpipelined command packet is dequeued and accepted into the pipeline only after the previous unpipelined command has been processed and if the address of the command does not match the address of any in-progress command. Any other pipelined packets arriving before, during, or after the unpipelined command packet are processed in the normal pipeline fashion providing they also meet the address match condition.

Snoop Pipeline Controller

Figure 5:
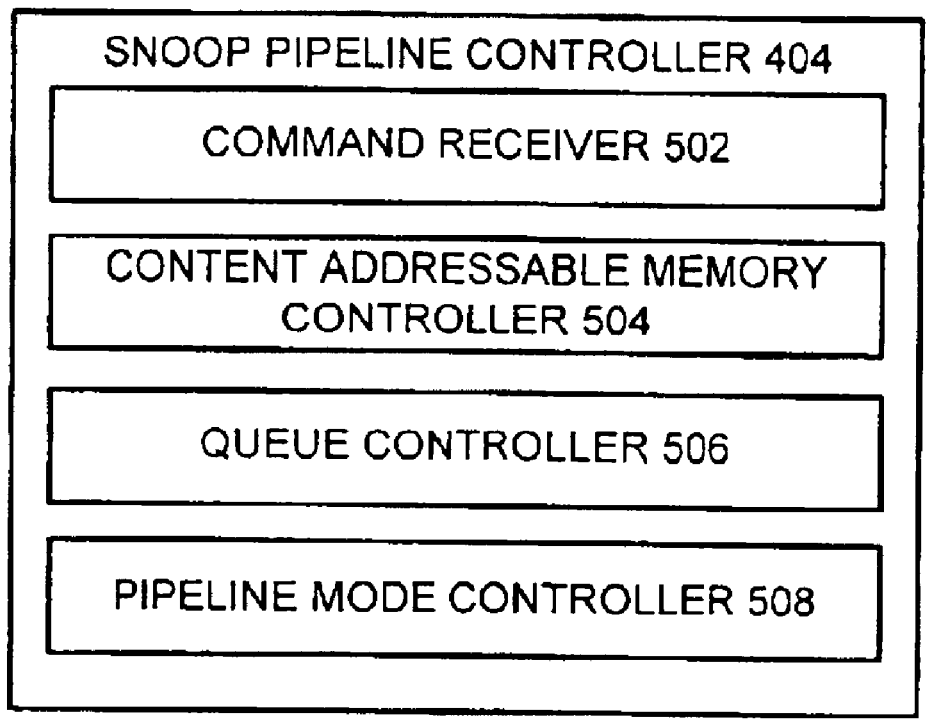
FIG. 5 illustrates a snoop pipeline controller in accordance with an embodiment of the present invention.

FIG. 5 illustrates a snoop pipeline controller in accordance with an embodiment of the present invention. Snoop pipeline controller 404 includes command receiver 502, content addressable memory controller 504, queue controller 506, and pipeline mode controller 508.

Command receiver 502 receives incoming command packet 402 for memory operations from processors coupled to bridge 214. Content addressable memory controller 504 compares the address in the command packets with addresses stored in CAM 406 to determine if a command for that address is currently in process. If a command for that address is currently in process, queue controller 506 enters the command in pending queue 408. If there is no command currently in process for that address, content addressable memory controller 504 enters the address in CAM 406 and sends the command to snoop pipeline 410.

When snoop pipeline 410 signals completion, content addressable memory controller 504 removes the address from CAM 406. Queue controller 506 then retries commands in pending queue 408 for that address. Pipeline mode controller 508 examines the pipeline bit within incoming command packet 402. If the pipeline bit is not set, pipeline mode controller 508 causes the packet to be processed as described above in conjunction with FIG. 4.

Pipelining Memory Commands

Figure 6:
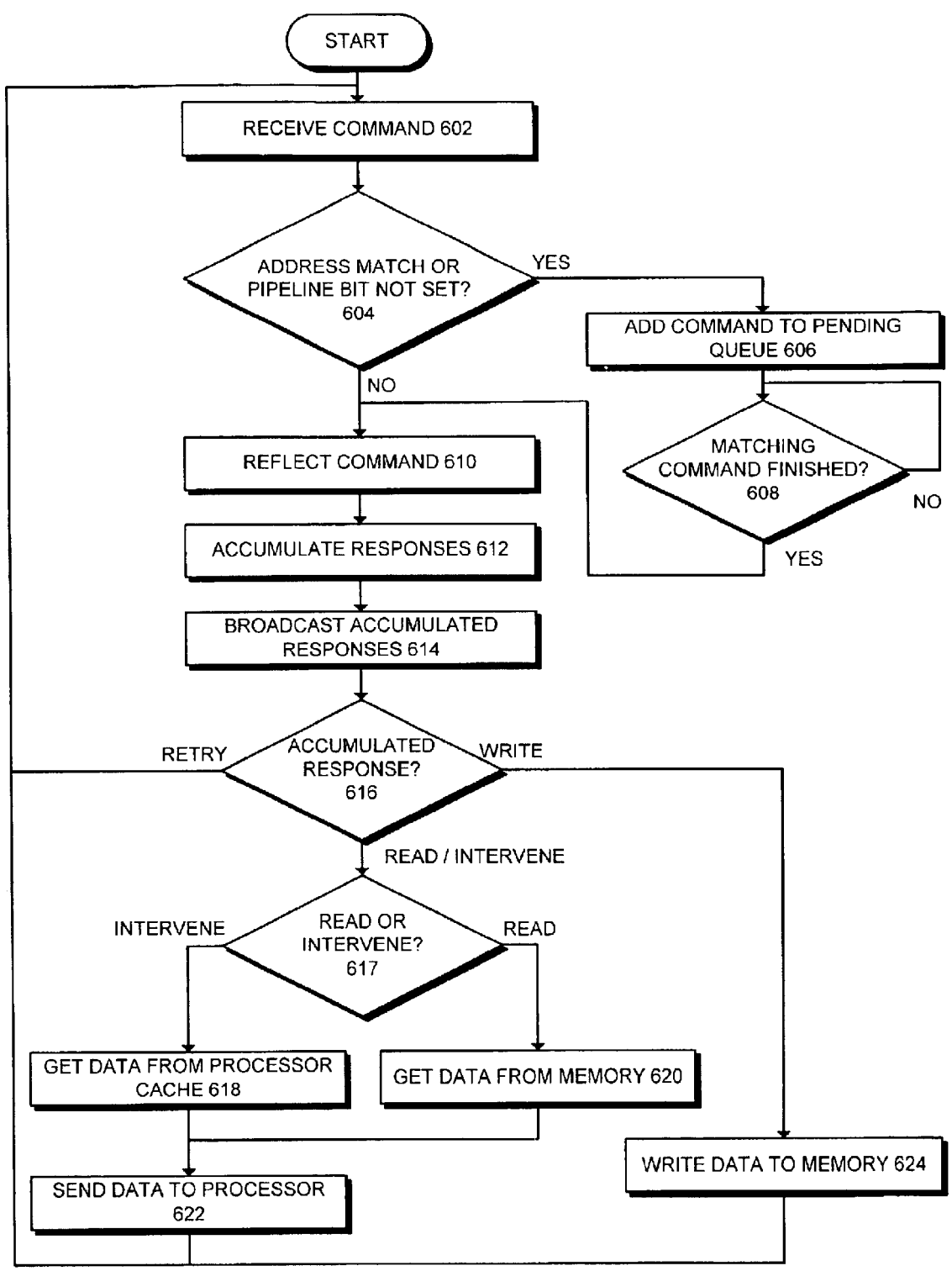
FIG. 6 is a flowchart illustrating the process of pipelining memory commands for a processor in accordance with an embodiment of the present invention.

FIG. 6 is a flowchart illustrating the process of pipelining memory commands for a processor in accordance with an embodiment of the present invention. The system starts when a memory command is received at the snoop pipeline controller (step 602). Next, the system determines if there is an address match with an address in the content addressable memory (CAM) or if the pipeline bit is not set (step 604). If there is an address match with an address in the content addressable memory (CAM) or if the pipeline bit is not set, the system adds the command to the pending queue (step 606). The system then waits until the matching command has finished (step 608).

If there is no match and the pipeline bit is set at step 604 or after the matching command has finished at step 608, the system reflects the command to each processor coupled to the bridge chip (step 610). Next, the bridge chip accumulates the responses to the reflected command (step 612). The system then broadcasts the accumulated responses to each processor (step 614).

The system then determines what processing is necessary (step 616). If the accumulated response is to write the data to memory, the system writes the data to memory (step 624). If the accumulated response is to read or intervene, the system determines where the data resides (step 617). If the accumulated response is read, the system gets the data from main memory (step 620). If the accumulated response is to intervene, the system gets the data from a processor cache (step 618). After the data is available, the system sends the data to the requesting processor (step 622). After writing data to memory at step 624, sending data to the processor at step 622, or if the accumulated response at step 616 is retry, the process returns to step 602 to receive another command.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for pipelining cache coherence operations in a shared memory multiprocessor system, comprising:
   receiving a command to perform a memory operation from a processor in the shared memory multiprocessor system;
   wherein the command is received at a coherence circuit that is coupled to local caches of processors in the shared memory multiprocessor system;
   if the command is directed to a cache line that is subject to an in-progress pipelined cache coherency operation, delaying the command until the in-progress pipelined cache coherency operation completes; and
   if the command is not directed to a cache line that is subject to an in-progress pipelined cache coherency operation:
      reflecting the command to local caches of other processors in the shared memory multiprocessor system,
      accumulating snoop responses from the local caches of other processors, and
      sending an accumulated snoop response to the local caches of other processors in the shared memory multiprocessor system.

2. The method of claim 1, wherein upon reflecting the command, the method further comprises storing an address associated with the command in a memory within the coherence circuit.

3. The method of claim 2, wherein determining if the command is directed to a cache line that is subject to an in-progress pipelined cache coherency operation involves comparing a received address with addresses of in-progress pipelined cache coherency operations stored in the memory within the coherence circuit.

4. The method of claim 2, further comprising removing the address from the memory within the coherence circuit when the command is complete.

5. The method of claim 1, further comprising:
examining a pipeline bit within the command; and
if the pipeline bit is not set, processing the command in a non-pipelined mode.

6. The method of claim 5, wherein processing the command in the non-pipelined mode further comprises:
waiting for in-progress commands to complete;
reflecting the command to local caches of other processors in the shared memory multiprocessor system; and
resuming processing of subsequent commands.

7. The method of claim 5, wherein processing the command in the non-pipelined mode further comprises:
reflecting the command to local caches of other processors in the shared memory multiprocessor system;
waiting for in-progress commands including the command to complete; and
resuming processing of subsequent commands.

8. The method of claim 5, wherein processing the command in the non-pipelined mode further comprises:
waiting for in-progress commands to complete;
reflecting the command to local caches of other processors in the shared memory multiprocessor system;
waiting for the command to complete; and
resuming processing of subsequent commands.

9. The method of claim 5, wherein processing the command in the non-pipelined mode further comprises:
examining a memory within the coherence circuit to determine if an in-progress command is being processed in the non-pipelined mode; and
if so, waiting for the in-progress command being processed in the non-pipelined mode to complete before reflecting the command to local caches of other processors in the shared memory multiprocessor system.

10. An apparatus for pipelining cache coherence operations in a shared memory multiprocessor system, comprising:
a receiving mechanism that is configured to receive a command to perform a memory operation from a processor in the shared memory multiprocessor system;
wherein the receiving mechanism is located in a coherence circuit that is coupled to local caches of processors in the shared memory multiprocessor system;
a delaying mechanism that is configured to delay the command until an in-progress pipelined cache coherency operation completes if the command is directed to a cache line that is subject to the in-progress pipelined cache coherency operation;
a reflecting mechanism that is configured to reflect the command to local caches of other processors in the shared memory multiprocessor system;
an accumulating mechanism that is configured to accumulate snoop response to the local caches of other processors; and
a sending mechanism that is configured to send an accumulated snoop response to the local caches of other processors in the shared memory multiprocessor system.

11. The apparatus of claim 10, further comprising a storing mechanism that is configured to store an address associated with the command in a memory within the coherence circuit.

12. The apparatus of claim 11, further comprising a comparing mechanism that is configured to compare a received address with addresses of in-progress pipelined cache coherency operations stored in the memory within the coherence circuit to determine if the command is directed to a cache line that is subject to an in-progress pipelined cache coherency operation.

13. The apparatus of claim 11, further comprising a removing mechanism that is configured to remove the address from the memory within the coherence circuit when the command is complete.

14. The apparatus of claim 10, further comprising:
an examining mechanism that is configured to examine a pipeline bit within the command; and
a processing mechanism that is configured to process the command in a non-pipelined mode if the pipeline bit is not set.

15. The apparatus of claim 14, further comprising:
a waiting mechanism that is configured to wait for in-progress commands to complete;
a reflecting mechanism that is configured to reflect the command to local caches of other processors in the shared memory multiprocessor system; and
a resuming mechanism that is configured to resume processing of subsequent commands.

16. The apparatus of claim 14, further comprising:
a reflecting mechanism that is configured to reflect the command to local caches of other processors in the shared memory multiprocessor system;
a waiting mechanism that is configured to wait for in-progress commands including the command to complete; and
a resuming mechanism that is configured to resume processing of subsequent commands.

17. The apparatus of claim 14, further comprising:
a waiting mechanism that is configured to wait for in-progress commands to complete;
a reflecting mechanism that is configured to reflect the command to local caches of other processors in the shared memory multiprocessor system;
wherein the waiting mechanism that is configured to wait for the command to complete; and
a resuming mechanism that is configured to resume processing of subsequent commands.

18. The apparatus of claim 14:
wherein the examining mechanism is further configured to examine a memory within the coherence circuit to determine if an in-progress command is being processed in the non-pipelined mode; and
a waiting mechanism that is configured to wait for the in-progress command being processed in the non-pipelined mode to complete before reflecting the command to local caches of other processors in the shared memory multiprocessor system if an in-progress command is being processed in the non-pipelined mode.

19. The apparatus of claim 10, wherein the coherence circuit is located within a bridge chip that couples processors with memory.

20. An apparatus for pipelining cache coherence operations in a shared memory multiprocessor system, comprising:

- a receiving mechanism that is configured to receive a command to perform a memory operation from a processor in the shared memory multiprocessor system;
- wherein the receiving mechanism is located in a bridge that is coupled to local caches of processors in the shared memory multiprocessor system;
- a comparing mechanism that is configured to compare an address within the command with addresses stored in a memory within the bridge to determine if the command is directed to a cache line that is subject to an in-progress pipelined cache coherency operation;
- a reflecting mechanism that is configured to reflect the command to local caches of other processors in the shared memory multiprocessor system;
- an accumulating mechanism that is configured to accumulate snoop responses from local caches of other processors;
- a sending mechanism that is configured to send an accumulated snoop response to local caches of other processors in the shared memory multiprocessor system; and
- a delaying mechanism that is configured to delay the command until an in-progress pipelined cache coherency operation completes if the command is directed to a cache line that is subject to an in-progress pipelined cache coherency operation.

* * * * *

UNITED STATES PATENT AND TRADEMARK OFFICE
CERTIFICATE OF CORRECTION

PATENT NO. : 6,848,032 B2
DATED : January 25, 2005
INVENTOR(S) : Jack Benkual et al.

It is certified that error appears in the above-identified patent and that said Letters Patent is hereby corrected as shown below:

<u>Title page,</u>
Item [75], Inventors, the 4th name should read -- Ronald Ray Hochsprung --.

Signed and Sealed this

Twenty-sixth Day of April, 2005

JON W. DUDAS
*Director of the United States Patent and Trademark Office*